United States Patent [19]
Moss

[11] Patent Number: 4,736,545
[45] Date of Patent: Apr. 12, 1988

[54] MACHINE FOR TAPERING FIBERGLASS PIPE ENDS AND METHOD OF USING THE MACHINE

[76] Inventor: Billy Moss, 2064 Carters Creek Pike, Franklin, Tenn. 37064

[21] Appl. No.: 919,976

[22] Filed: Oct. 17, 1986

[51] Int. Cl.$^4$ .............................................. B24B 9/20
[52] U.S. Cl. ..................................... 51/102; 51/5 B; 51/170 PT; 51/273; 51/290; 409/165; 409/179; 409/199
[58] Field of Search ............... 51/5 R, 5 B, 5 C, 102, 51/103 R, 103 C, 170 R, 170 PT, 181 R, 236, 241 S, 241 G, 273, 281 R, 289 R, 290, 323; 409/165, 179, 199; 29/76 R

[56] References Cited

U.S. PATENT DOCUMENTS

| | | | |
|---|---|---|---|
| 2,909,011 | 10/1959 | Hendricks et al. | 51/102 |
| 3,698,140 | 10/1972 | Steadman | 51/241.6 |
| 4,156,990 | 6/1979 | Rutkowski | 51/170 PT |
| 4,233,782 | 11/1980 | Perrault | 51/5 R |
| 4,541,760 | 9/1985 | Zoueki | 51/102 X |
| 4,589,231 | 5/1986 | Roberts | 51/273 X |
| 4,633,621 | 1/1987 | Weber | 51/181 R |

FOREIGN PATENT DOCUMENTS

2826413  12/1979  Fed. Rep. of Germany ...... 409/179

OTHER PUBLICATIONS

Ameron Bulletin, 7501 entitled "Dualoy 300/L Installation Practices".

Primary Examiner—Robert P. Olszewski
Attorney, Agent, or Firm—Steele Gould & Fried

[57] ABSTRACT

A machine for tapering the ends of lengths of fiberglass pipe is disclosed. The machine includes an enclosing cabinet having mounted therein an electric motor and a vacuum system. A grinding wheel is rotated by the motor within the cabinet and preferably the vacuum system is wired for operation at all times when the electric motor is operated. One or more stationary mandrels mount in spaced relationship to the grinding wheel and are slightly angularly oriented relative thereto. Portions of the mandrel extend exteriorly of the cabinet to provide a positioning projection to receive one end of a length of fiberglass pipe in sliding engagement. The pipe is manually fed over the mandrel toward the rotating grinding wheel and is rotated as it is inwardly urged to form a circumferencial taper in the end of the fiberglass pipe. The vacuum system includes an inlet immediately adjacent to the grinding wheel to attract all particulate matter resulting from the grinding operation and to prevent escape of fiberglass dust to the atmosphere.

24 Claims, 3 Drawing Sheets

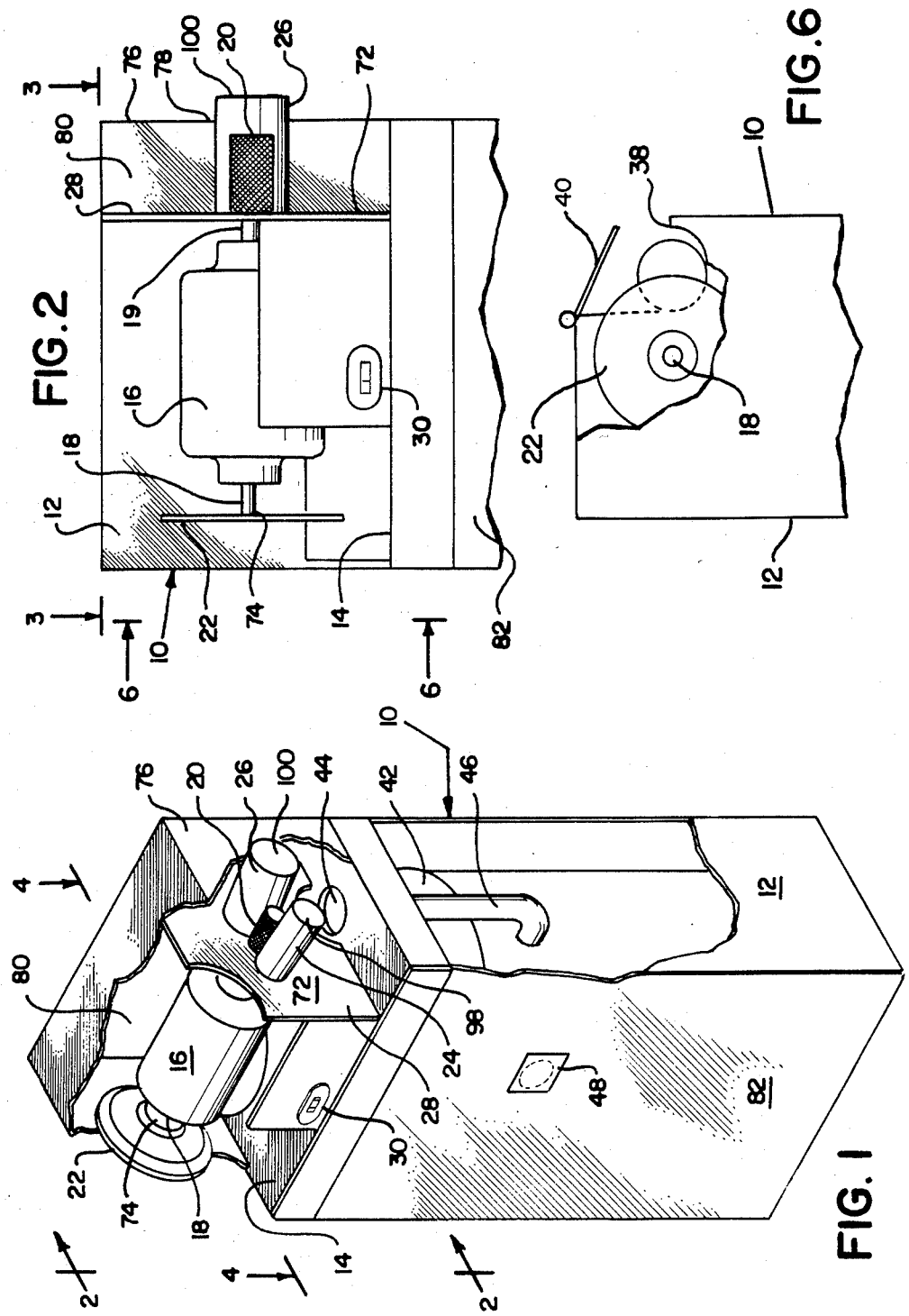

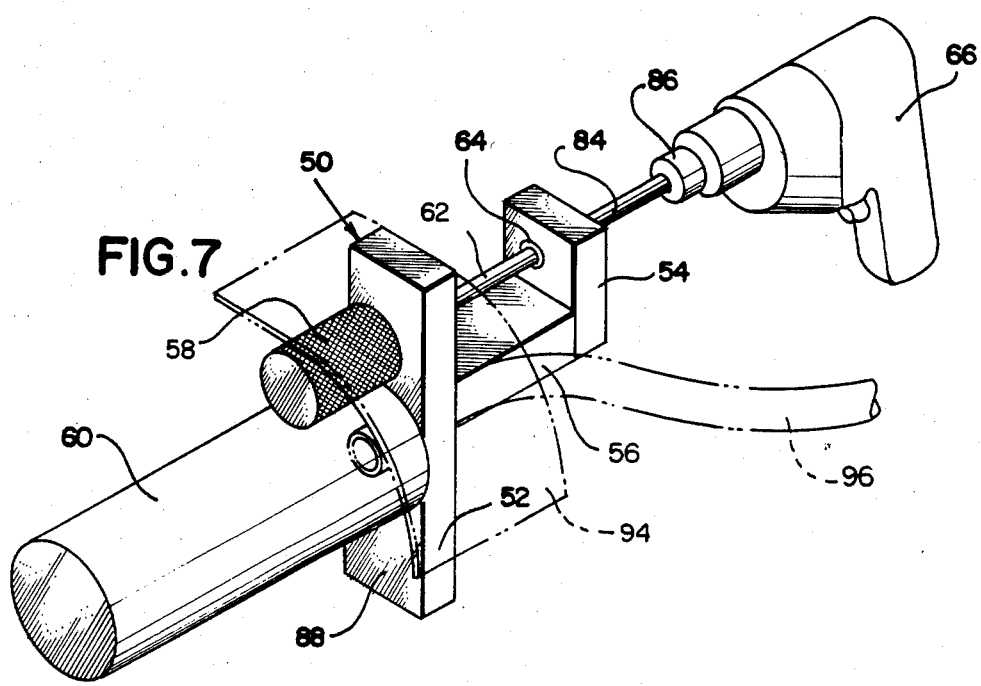
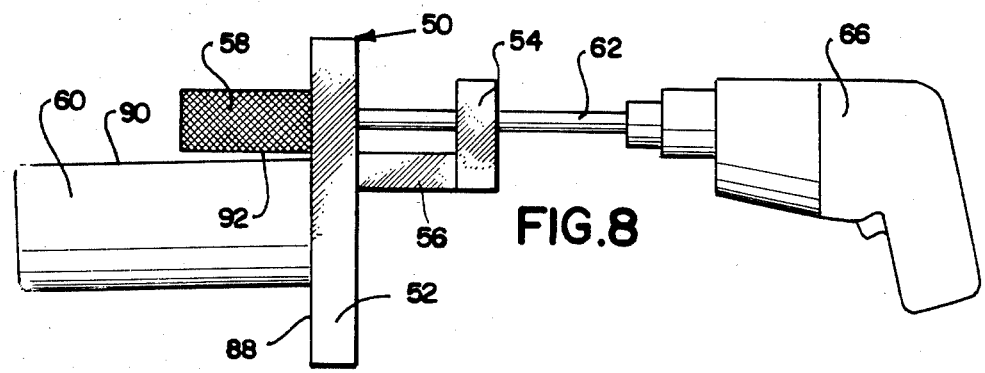
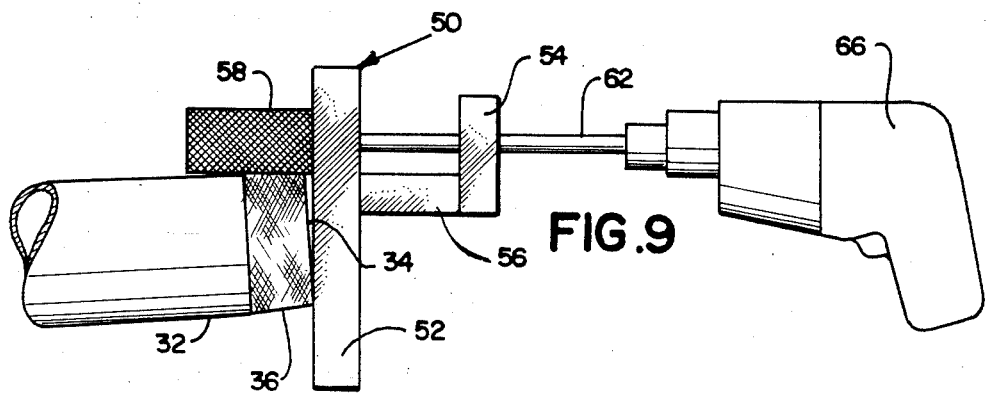

MACHINE FOR TAPERING FIBERGLASS PIPE ENDS AND METHOD OF USING THE MACHINE

BACKGROUND OF THE INVENTION

1. Field of the Invention:

The present invention relates generally to tapering machines, and more particularly, is directed to a machine capable of field tapering the ends of fiberglass pipe for connection with the factory tapered sections of connected couplings, fittings and nipples.

2. Description of the Prior Art:

In the automotive service station industry, it is the usual practice to provide a plurality of approved underground storage tanks of various sizes in approved underground locations for storage and subsequent dispensing of gasoline and other types of flammable liquids. Such underground flammable liquid storage tanks are generally fabricated either of steel or fiberglass construction materials to meet local regulations and industry standard, such as N.F.P.A. Pamphlet 30. It is the common practice to install the underground storage tanks in multiples or banks beneath the driveway surface and each tank requires the usual piping connections. The storage tanks are interconnected by piping with each other and with pluralities of above ground gasoline dispensing units for ultimate vending or dispensing into the tanks of automobiles. Additionally, each tank must be equipped with suitable fill and vent pipes for safe operation. The dispensing units are generally employed in multiple arrangements and are usually mounted on one or more service islands in accordance with the usual practice in the industry.

In the past, it was most common to employ conventional steel piping between the underground storage tanks and the dispensing units mounted upon the service islands. More recently, fiberglass reinforced epoxy piping has been developed and has gained authority approval and increasing popularity for such underground piping systems. One fiberglass reinforced epoxy pipe which has been listed by Underwriters' Laboratories, Inc. as meeting the standards set forth in NFPA Pamphlet 30 has been developed and sold by Fiberglass Pipe Division, Houston, Tex. under the trademark "AMERON". Other fiberglass pipe manufacturers include A. O. Smith-Island, Inc. and Ciba-Geigy.

When employing the approved fiberglass pipe for automotive service station installations, it is practically always necessary to cut a considerable portion of such pipes to size directly at the jobsite to meet the existing local conditions. The interconnection between the ends of lengths of pipe and fittings in the listed fiberglass piping systems is always made by tapering the interior cavity of the fitting and by providing a cooperating taper in the exterior periphery of the pipe end. In the approved fiberglass pipe systems, the fittings and couplings are tapered at the factory with a uniform 1¾ degree taper for all usual pipe diameters from 2 inches through 6 inches pipe size. The taper length varies from 1½ inches for 2 inch diameter pipe up to 2¾ inches for 6 inch diameter pipe.

It will be appreciated that the taper of the pipe end must correspond substantially identically to the factory made taper in the connecting fittings and couplings to prevent leakage and these precise tapers must be field made in those fiberglass pipe sections which have been duly cut to the required length at the installation site. After the tapers of the required angularity have been formed in the pipe ends (either at the factory or in the field), the joint is made up in a leak-proof junction by employing a coating of an approved adhesive.

Prior workers in the art have developed field tapering equipment which is designed to cut the required 1½ degree taper on the 2 inch through 6 inch pipe ends. Such prior art field tapering machines have usually utilized shaving blades and the like and such machines as previously developed have generally proved to be satisfactory for providing the required pipe end taper of the necessary angularity. However, such prior art machines have suffered from drawbacks such as significantly high costs and the fact that such machines offer little or no safety to the user from the environmental problems created by the cutting, shaving and other operations which may be necessary to effect the pipe end taper. Keeping in mind the fiberglass content of the piping materials, it will be appreciated that when such fiberglass is broken down into fine particles by the cutting, shaving and other operations, such fine particles could be extremely injurious and dangerous to the health of the user.

Accordingly, it is now the common practice to require or recommend that the field pipe end tapering machine users employ dust masks over their faces when using the existing pipe tapering machines to properly form the required taper. While such masks will to a large extent alleviate the fiberglass dust problem, such masks are not one hundred percent effective under usual working conditions. Additionally, some workers either carelessly or defiantly will often neglect wearing the face masks, thereby subjecting themselves to the dangers of inhaling fiberglass dust and particles.

SUMMARY OF THE INVENTION

The present invention relates generally to a pipe tapering machine that is capable of field operation at the jobsite, and more particularly, is directed to a machine that is especially designed to taper the ends of fiberglass pipe within an environmentally protective enclosure.

The machine of the present invention comprises generally an enclosing cabinet which may conveniently be fabricated of sheet steel or other suitable sturdy sheet materials. Within the cabinet is mounted an electric motor in generally horizontal orientation for simultaneous operation of a grinding wheel and a rotary cut-off blade. The motor is securely mounted upon a sturdy platform and is wired to rotate its shaft upon the closing of an electrical circuit in usual manner. At one end of the shaft is mounted a cut-off blade or disc of suitable construction and configuration to cut sections of fiberglass pipe to any desired length. The other end of the motor shaft is employed to simultaneously rotate the grinding wheel. In the preferred embodiment, the machine is designed for use with both 2 inch and 3 inch diameter fiberglass pipe. Accordingly, the cutting blade should be of sufficient diameter to completely and easily cut through a 3 inch diameter fiberglass pipe section. Optionally, the machine can be modified to taper and cut pipe of larger diameters.

Adjacent the grinder end of the motor is secured a vertical bulkhead which is provided with an opening to receive the end of the motor shaft therethrough. Mounted on the shaft on the exterior facing side of the bulkhead opposite the motor is a suitable cylindrical grinder wheel which can be employed to taper the ends of the previously measured and cut fiberglass pipe. In the preferred embodiment, a cylindrical stone grinder is affixed to the motor shaft in a manner to be rotated when the motor shaft is rotated. When the fiberglass pipe end is brought into engagement with the grinder, the rotating grinder wheel will grind and chamfer the pipe end outer periphery to the desired angular taper.

Additionally mounted on the exterior side of the bulkhead in immediate juxtaposition to the grinder is at least one and preferably two stationary, cylindrical mandrels, one mandrel being sized to receive and secure one end of a length of 2 inch fiberglass plastic pipe and another mandrel being sized to receive and secure one end of a 3 inch length of fiberglass plastic pipe. In this manner a single pipe end tapering machine can be made universally adaptable to treat the pipe sizes most frequently encountered in automobile service station installations. Optionally, the machine can be altered and equipped as necessary to treat larger diameter pipes.

The mandrels are angularly oriented relative to the grinder whereby the longitudinal axis of each mandrel is offset from the longitudinal axis of the grinder through an angle of $1\frac{3}{4}$ degrees. The outer periphery of each mandrel terminates at the bulkhead in proximity to the outer periphery of the grinder. Preferably, the spacing between the respective outer peripheries of the mandrels and the grinder at the bulkhead should be in the neighborhood of 0.03 inches whereby upon completion of the pipe end taper, the thin edge of the taper will be approximately 0.030 inches (1/32") in thickness.

It is an important feature of this invention that the enclosing cabinet overfit the rotating grinder to thereby retain there within all of the ground and loose dust and other particles of fiberglass pipe as they are produced during the tapering operations. The cabinet vertical sidewall in lateral registry over the 2 inch and 3 inch mandrels is provided with openings of sufficient diameter to receive end portions of the mandrels therethrough. The cabinet sidewall openings should additionally be sufficiently large to permit one end of a length of 2 inch fiberglass pipe and one end of a length of 3 inch fiberglass pipe to be applied over the respective 2 inch and 3 inch mandrels to be urged inwardly of the enclosure until the end of the fiberglass pipe to be tapered contacts and stops against the outer surface of the bulkhead. The angularity of the respective axes of the grinder and the mandrels and the spacing between the respective outer peripheries of the mandrels and the grinder at the bulkhead combine to assure the grinding of a properly configured taper at each treated pipe end.

A vacuum opening is provided in the motor mounting platform immediately below the grinder and a suitable hose, conduit or other channel is provided between the platform opening and a lower positioned vacuum system. Preferably, the vacuum system is self-contained and has its motor wired in parallel with the main grinder motor. Accordingly, when the grinder motor is energized to rotate the grinder wheel the vacuum system will also automatically be simultaneously activated.

Upon introduction of the respective ends of lengths of fiberglass pipe over a mandrel with the grinder motor being energized, the rotating grinder wheel can be utilized to grind a suitable taper in the end of the length of pipe of precisely $1\frac{3}{4}$ degrees, thereby conforming the end of the fiberglass pipe to the configuration of the socket which is factory formed in a usual fiberglass fitting.

In a modified embodiment of the invention, a portable type of fiberglass pipe tapering tool has been developed for use in relatively remote or inaccessible locations. The portable device comprises generally a bulkhead upon which is mounted a mandrel having its axis positioned at an angle $1\frac{3}{4}$ degrees from the normal to the plane of the bulkhead. The mandrel may be sized to accommodate 2 inch, 3 inch or larger sized pipes. Spaced from the mandrel is positioned a rotary grinder in a position wherein the outer periphery of the grinder is spaced from the outer periphery of the mandrel by a distance of approximately 1/32 inch. A grinder shaft is rotatably journalled within the bulkhead and extends through a rearwardly spaced wall wherein it is also rotatably mounted. By connecting a portable motor operated device, for example an electric hand drill, to the rearward end of the grinder shaft, the grinder can be rotated for pipe end tapering when desired and at the same time can be rendered readily portable.

In a preferred embodiment of the portable device, a portable hood is affixed to the bulkhead in the vicinity of the grinder and a portable hose interconnects the hood with a source of vacuum in a known manner. Accordingly, when the vacuum system is activated, suction forces will be applied at the hood to thereby control most fiberglass dust and particles by pulling such particles into the vacuum system, rather than permitting random dispersion into the surrounding atmosphere. It is contemplated that the source of vacuum will be the vacuum system integrally provided in the basic pipe end tapering machine hereinbefore described.

The portable pipe end tapering machine is similar in use and concept to the non-portable machine and can be readily employed under field conditions to taper an end of a length of fiberglass plastic pipe in remote locations, for example, at the bottom of a tank excavation or within a pipe trench. In operation, the end of the pipe to be tapered is manually urged over the mandrel and toward the bulkhead while being hand rotated. By operating the electric drill, the grinder will be rotating as the end of the pipe is urged axially inwardly along the mandrel. Due to the angularity between the axis of the mandrel and the axis of the grinder, a taper will be automatically formed in the end of the pipe by the time the pipe contacts the bulkhead.

It is therefore an object of the present invention to provide an improved machine for tapering fiberglass pipe ends of the type set forth.

It is another object of the present invention to provide a novel machine for tapering fiberglass pipe ends which includes an enclosing cabinet, a vacuum system within the cabinet and tapering means to apply a taper of predetermined angularity to the end of a length of fiberglass pipe in a manner to prevent escape of fiberglass particles into the atmosphere.

It is another object of the present invention to provide a novel machine for tapering fiberglass pipe ends comprising a motor mounted for rotation within an enclosing cabinet, grinder means rotated by the motor within the cabinet, mandrel means mounted in spaced relationship to the grinder means and partially extending exteriorly of the cabinet, the axis of the mandrel means being angularly offset from the axis of the grinder means and vacuum system means within the cabinet, the vacuum system means including an inlet positioned near the grinder means to attract fiberglass dust and particles resulting from the pipe end tapering operations.

It is another object of the present invention to provide a portable fiberglass pipe end tapering machine comprising a bulkhead and a wall rearwardly spaced from the bulkhead, a grinder shaft journalled for rotation within the bulkhead and rear wall, the grinder shaft extending rearwardly of the rear wall, a grinder rotated by the grinder shaft in front of the bulkhead, a mandrel stationarily secured to the front of the bulkhead in juxtaposition to the grinder, the axis of the mandrel being angularly offset from the axis of the grinder and a portable vacuum system connected to the bulkhead in a manner to attract and remove fiberglass particles as such particles are generated during the fiberglass pipe end tapering operations.

It is another object of the present invention to provide a novel machine for tapering fiberglass pipe ends that is simple in design, inexpensive in manufacture and trouble free when in use.

Other objects and a fuller understanding of the invention will be had by referring to the following description and claims of the preferred embodiments taken in conjunction with the accompanying drawings, wherein like reference characters refer to similar parts throughout the several views and in which:

BRIEF DESCRIPTION OF THE DRAWINGS

FIG. 1 is a perspective view showing the machine for tapering fiberglass pipe ends in accordance with the present invention and partly broken away to expose interior construction features.

FIG. 2 is a partial cross sectional view taken along line 2—2 on FIG. 1 looking in the direction of the arrows.

FIG. 6 is a partial cross sectional view taken along line 6—6 on FIG. 3, looking in the direction of the arrows.

FIG. 7 is a perspective view showing a portable embodiment of the machine for tapering the ends of fiberglass pipe with the vacuum hood and hose illustrated in phanton lines.

FIG. 8 is a side elevational view of the embodiment of FIG. 7.

FIG. 9 is a side elevational view similar to FIG. 8 showing one end of the length of fiberglass pipe applied over the mandrel.

Figure 4:
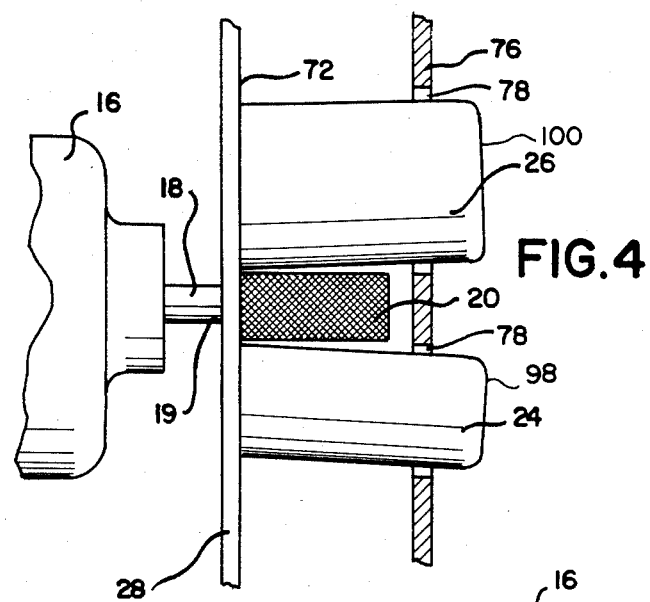
FIG. 4 is an enlarged, partial, top plan view looking from line 4—4 on FIG. 1.

DESCRIPTION OF THE PREFERRED
EMBODIMENT OF THE INVENTION

Although specific terms are used in the following description for the sake of clarity, these terms are intended to refer only to the particular structure of the invention selected for illustration in the drawings, and are not intended to define or limit the scope of the invention.

Figure 3:
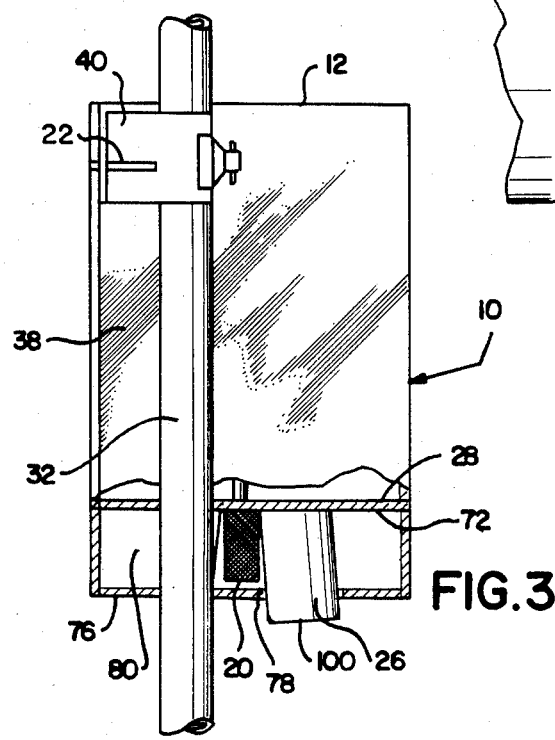
FIG. 3 is top plan view looking from line 3—3 on FIG. 2 and partially broken away to expose interior construction details.

Referring now to the drawings, there is illustrated in FIGS. 1, 2 and 3 a machine 10 suitable for forming a tapered or truncated conical configuration at one end of a length of fiberglass pipe. The machine 10 comprises an enclosing cabinet 12 which preferably may be fabricated of sheet steel in usual manner. Alternately, the enclosing cabinet could be fabricated of other sheet materials, for example rigid plastic sheets. The cabinet 12 encloses a bottomly positioned vacuum device 42 which is permanently installed below the motor mounting platform 14. The vacuum device 42 can be of any suitable, known brand, for example the type of vacuum device that has been designed and developed for use in residential, permanently installed, vacuum systems.

An electric motor 16 is securely mounted upon the motor mounting platform 14 in usual manner and is positioned to orient its rotatable shaft 18 in horizontal alignment as shown. The motor 16 is positioned adjacent to a fixed, vertical bulkhead 28 and one end 19 of the shaft 18 extends through an opening in the bulkhead 28 to rotatively carry a cylindrical grinder 20 in front of the forward surface 72 of the bulkhead 28. It is noteworthy that the axis of the motor shaft 18 and the longitudinal axis of the grinder 20 are oriented to be perfectly normal to the plane of the bulkhead 28. The other end 74 of the motor shaft 18 extends rearwardly of the motor 16 and rotatively carries a rotary cutting blade 22. The rotary cutting blade 22 is fabricated of suitable diameter and of known material to conveniently cut sections of fiberglass pipe 32 to desired lengths.

Mounted upon the front surface 72 of the bulkhead 28 in lateral juxtaposition to the grinding wheel 20 are one or more stationary mandrels 24, 26. The mandrels 24, 26 may be fabricated of wood or other study material and are secured to the bulkhead 28 in stationary relationship. In a preferred embodiment, through bolts can be employed to affix the mandrels to the bulkhead. In the illustrated embodiment, the mandrel 24 is fabricated of slightly less than 2 inch diameter to receive and support thereon one end of a length of 2 inch diameter fiberglass pipe. The second mandrel 26 is preferably fabricated slightly less than 3 inches in diameter to thereby receive and support thereon one end of a length of 3 inch fiberglass plastic pipe. It will be appreciated that other mandrels of nominal 4, 5 and 6 inch diameter could similarly be provided to accommodate fiberglass pipe of other diameters.

Figure 5:
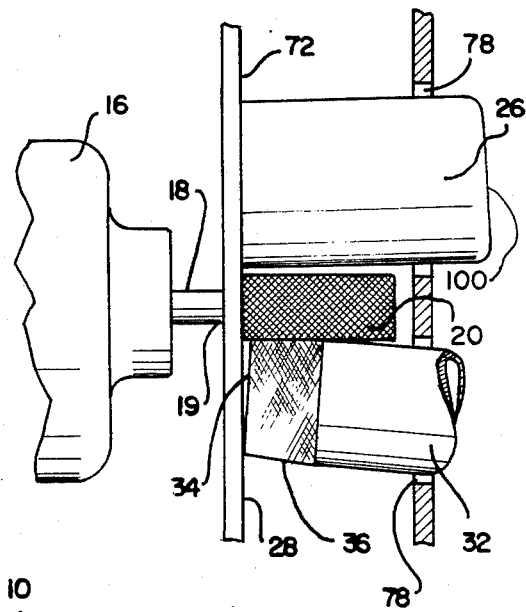
FIG. 5 is a partial, top plan view similar to FIG. 4 illustrating a fiberglass pipe end applied on one of the mandrels.

As best seen in FIGS. 4 and 5, the mandrels 24, 26 are mounted on the bulkhead 28 in a manner whereby their respective longitudinal axes are positioned in slight angularity to the axis of the cylindrical grinder 20. As hereinabove set forth, it is the standard of the fiberglass pipe industry to taper the joining portions of adjacent parts at precisely 1¾ degrees so that uniform, leak-proof joints can be readily made up. Accordingly, the angularity between the respective axes of the mandrels 24, 26 and the longitudinal axis of the grinder should be set at precisely 1¾ degrees. Additionally, in order to meet the industry standard whereby the thin edge of the pipe at the end of the taper 36 is approximately 1/32 inch, the distance between the respective outer peripheries of the mandrels 24, 26 and the outer periphery of the grinder 20 at the front face 72 of the bulkhead should thereby be adjusted to be precisely 1/32 inch. In this manner, when a length of fiberglass pipe 32 is applied over a mandrel 24 or 26 with the grinder 20 rotating, and the pipe is manually urged axially along a respective mandrel until the pipe end 34 contacts the forward surface 72 of the bulkhead 28, the exact tapered area 36 of desired angularity, length and pipe end thickness will thus be automatically formed without requiring any skilled intervention on the part of the operator (not shown).

As best seen in in FIGS. 4 and 5, the enclosure front wall 76 is provided with mandrel openings 78 through which the forward ends of the mandrels 24, 26 project. Sufficient clearance is provided between the outer periphery of each of the mandrels 24, 26 and the mandrel openings 78 to permit one end of a fiberglass plastic pipe to be applied over the mandrel and then inwardly urged until the pipe and 34 stops against the forward surface 72 of the bulkhead 28. In the event that larger pipes and larger mandrels may be required, then the mandrel openings 78 similarly would have to be enlarged.

Still referring to FIGS. 2 and 3, and further considering FIG. 1, it will be noted that the grinding wheel or grinder 20 is positioned entirely within the interior 80 of the enclosing cabinet 12 whereby any fiberglass particles or dust which may be generated by the grinding of the tapered areas 36 will be restrained within the enclosure interior 80 so as not to pollute the atmosphere to thereby create an unhealthy environment for the machine operator or others.

A vacuum system of 42 of known construction is illustrated as being mounted within the interior of the enclosure 12 below the motor mounting platform 14 to provide a compact, pleasingly configured machine 10. It is within the intent and the scope of the present invention to also provide a vacuum system 42 that is separate from the enclosing cabinet 12 provided that the vacuum system is so connected as to remove fiberglass particles and dust from within the interior 80 of the cabinet 12.

As shown in FIG. 1, a vacuum inlet opening or port 44 is provided in the motor mounting platform 14 immediately below the grinder 20. A vacuum hose or conduit 46 interconnects the vacuum inlet opening 44 with the intake to the vacuum system 42 in a known manner. Accordingly, when the vacuum system 42 is actuated, suction forces will be applied at the vacuum inlet opening 44 to encourage the entrance of fiberglass dust and particles and to maintain the interior and exterior areas of the machine 10 free from fiberglass dust. As illustrated, one or more of the walls 82 of the enclosing cabinet 12 can be equipped with a conventional vacuum inlet 48 in usual manner to facilitate the connection of an exterior vacuum hose. Accordingly, vacuum forces can be readily applied to an elongated vacuum hose for remote, portable operation in the manner hereinafter more fully set forth.

Referring now to FIGS. 1, 3, and 6, the top of the enclosing cabinet 12 is bent, curved or otherwise worked to form a longitudinally extending pipe receiving trough 38 of suitable size to longitudinally receive a length of fiberglass pipe therein. The axis of the trough 38 is laterally offset from the axis of the motor shaft 18 and is parallel thereto. The trough 38 is positioned to interset the outer periphery of the cutting blade 22 so that the blade is exposed within the trough for pipe cutting purposes. If desired, a protective cover 40 (FIG. 3) can be affixed to the top of the enclosure 12 in a manner to extend over the the trough 38 to shield the cutting operation as the cutting blade 22 is rotated to cut a length of fiberglass pipe 32 to a desired size.

In operation, a conventional switch 30 can be affixed to one sidewall of the enclosing cabinet 12 to energize the motor 16 in usual manner. Energization of the motor 16 will cause the motor shaft 18 to rotate, thereby simultaneously rotating the grinder 20 and the cutting blade 22. Accordingly, the machine 10 can be employed optionally to either cut a length of fiberglass pipe to size or to taper one end of a length of fiberglass pipe for interconnection with a fiberglass pipe fitting in known manner. Preferably, the vacum system 42 is wined directly into the motor circuit whereby when the electrical circuit is energized by operation of the switch 30, both the motor 16 and the vacuum device 42 will simultaneously operate. By wiring the vacuum device 42 to the motor circuit, vacuum operation will be assured at all times when the cylindrical grinder 20 is being utilized.

Referring now to FIGS. 7, 8 and 9, there is illustrated a portable embodiment. 50 of a pipe end tapering machine which is suitable for tapering fiberglass pipe ends in a remote location. The portable embodiment 50 comprises generally a strudy bulkhead 52 and a parallel rear wall 54 which is spaced from the bulkhead by a strut or spacer 56. Both the bulkhead 52 and the rear wall 54 are provided with aligned openings having bearings 64 positioned therein in a manner to journal an elongated grinder shaft 62 for rotation relative to the frame. As illustrated, a cylindrical grinding wheel 58 is affixed to one end of the grinder shaft 62 forwardly of the bulkhead 52. The grinder shaft 62 extends rearwardly of the rear wall 54 and terminates in a shaft extension 84 which can be turned by a rotary power tool, such as a usual portable electric hand drill 66. The rearward end of the shaft extension 84 is intended to be clamped in the chuck 86 of the hand drill 66 to rotate the cylindrical grinder 58 upon energization of the hand drill motor.

A cylindrical mandrel 60, which may be fabricated of a solid block of wood, is stationarily affixed to the front face 88 of the bulkhead 52 in spaced relationship to the grinder 58. In the manner hereinbefore described with regard to the first embodiment, it will be noted that the axis of the stationary mandrel 60 is angularly offset from the axis of the grinder 58 through an angle of 1¾ degrees. At the front face 88 of the bulkhead, the outer periphery 90 of the mandrel 60 is spaced from the outer periphery 92 of the ginder 58 by a distance of approximately 1/32 inch to thereby determine the thickness of the fiberglass pipe end 34 upon completion of the grinding of the taper 36.

As illustrated, a curved hood or shield 94 can be affixed to the bulkhead 52 in stationary manner to overfit portions of the cylindrical grinder 58 and the mandrel 60. The hood 94 supports the inlet end of a vacuum hose 96 and positions the vacuum hose inlet immediately adjacent to the grinder 58. Accordingly, when the grinder is rotated by the hand drill 66 to gind the tapered area 36 in the manner illustrated in FIG. 9, the combination of the vacuum hood 94 and vacuum hose 96 can be employed to prevent most of the fiberglass dust and particles from escaping to atmosphere. It is contemplated that the free end of the vacuum hose 96 will be operatively connected to the vacuum device 42 at the wall supported vacuum inlet 48 in a known manner.

Accordingly, it is intended that the portable embodiment 50 will be employed in conjunction with the stationary machine 10 at the job site. In those instances wherein the fiberglass pipe taper can be formed directly at the machine 10, then this machine will be employed for the pipe end tampering procedures. In those instances wherein a pipe end must be tapered in a remote location, then it is contemplated that the portable embodiment 50 will be utilized for this purpose and the worker and the environment will be protected from flying fiberglass particles by engaging the vacuum hose 96 with the stationary machine 10 at the vacuum inlet connection 48 thereof.

In order to use the machine 10 of the present invention, the motor 16 is first energized by operation of the manual switch 30 in a conventional manner. Energization of the motor 16 causes simultaneous rotation of both the cylindrical grinder 20 and the disk-like cutting wheel or blade 22. A length of fiberglass pipe 32 can then be placed in the pipe trough 38 in parallel relationship to the longitudinal axis of the motor 16. The longitudinal position of the pipe 32 can be adjusted within the trough 38 as necessary to align the portion to be cut with the cutting blade 22. The safety shield or protective cover 40 should be applied over the cutting blade in conventional manner to protect the workman from possible injury caused by flying particles. The pipe 32 may be manually rotated within the trough as necessary to apply the pipe to the cutting blade to cut the length of pipe to the desired size.

After the pipe 32 has been cut to size, with the motor 16 still energized, the pipe can be applied over the exposed end 98 of the 2 inch mandrel 24 or the exposed end 100 of the 3 inch mandrel 26, depending upon the diameter of the pipe. The pipe is then manually telescoped over the mandrel 24 or 26 through the mandrel opening 78 provided in the machine front wall 76 until the leading end 34 of the fiberglass pipe initially contacts the rotating grinder 20. The fiberglass pipe section 32 is then rotated upon the mandrel 24 or 26 by hand and is simultaneously manually fed interiorly of the machine 10 until the pipe end 34 contacts and stops against the forward surface 72 of the bulkhead 28. As best seen in FIG. 5, the preset angle between the axis of the cylindrical grinder 20 and the axis of a mandrel 24 or 26 will cause the taper 36 to be ground to precisely the desired angularity as required for interconnection with a factory made fitting.

In a preferred method of mounting the mandrels 24, 26 upon the bulkhead 28, axially positioned through bolts (not shown) may be employed by inserting the bolts through axial openings in the mandrels and through openings provided in the bulkhead 28. Preferably, the openings (not shown) in the bulkhead 28 are elongated openings wherein the long axis of the opening forms an extension of a diameter drawn through the motor shaft bulkhead opening. Such a construction permits limited adjustment of the position of the outer periphery of a mandrel relative to the outer periphery of the grinder. Additionally, it has been found desirable to provide at least one longitudinally extending groove (not shown) in the outer periphery of each mandrel to serve as an integral deburring implement upon completion of the tapering operation. Rotation of the tapered pipe end over such a longitudinal groove will result in the removal of any end burrs which may result from the cutting operation.

As above set forth, the vacuum device 42 will function simultaneously with the operation of the motor 16. It is noteworthy that all grinding operations occur interiorly of the enclosing cabinet 12 and that the vacuum inlet opening or port 44 is positioned immediately adjacent to the grinding wheel 20. Accordingly, all dust, particles and other fiberglass materials which may be separated during the tapering operation will remain interiorly of the cabinet 12 without conscious effort or any manual operations required on the part of the operator.

Although the invention has been described with a certain degree of particularity, it is understood that the present disclosure has been made only by way of example and that numerous changes in the details of construction and the combination and arrangement of parts may be resorted to without departing from the spirit and scope of the invention.

What is claimed is:

1. A machine for tapering fiberglass pipe ends comprising
   an enclosing cabinet, the cabinet comprising a bulkhead, the bulkhead having a rearward surface and a forward surface, the bulkhead being provided with an opening therethrough;
   a first motor mounted for rotation of a shaft within the cabinet, the shaft extending through the said bulkhead opening;
   grinder means rotated by the first motor shaft within the cabinet, the grinder means being positioned forwardly of the bulkhead forward surface to taper an end of a length of fiberglass pipe;
   stationary mandrel means mounted in spaced relationship to the grinder means upon the bulkhead forward surface, the mandrel means being at least partially within the cabinet to guide the end of the fiberglass pipe toward the grinder means,
   the grinder means and the mandrel means each having a longitudinal axis, the axis of the mandrel means being angularly offset from the axis of the grinder means; and
   vacuum system means associated with the cabinet to prevent escape of fiberglass dust resulting from the tapering operations,
      the vacuum system means comprising an inlet positioned near the grinding means to attract fiberglass particles and dust resulting from fiberglass pipe end tapering operations.

2. The machine of claim 1 wherein the cabinet is provided with an enclosing wall, the wall being provided with a pipe receiving opening, the opening being located in lateral registry over the mandrel means.

3. The machine of claim 2 wherein a portion of the mandrel means extends exteriorly of the cabinet through the said opening.

4. The machine of claim 3 wherein the diameter of the opening is sufficiently large to provide an annular clearance space between the outer periphery of the mandrel and cabinet wall, the annular clearance space being sufficient to receive the end of a length of fiberglass pipe therein as the pipe is telescoped over the mandrel.

5. The machine of claim 1 wherein the vacuum system means is mounted within the enclosing cabinet.

6. The machine of claim 5 wherein the vacuum system means comprises a second motor, the motor being wired to activate the vacuum system means when the first motor is activated.

7. The machine of claim 1 wherein the first motor shaft extends forwardly and rearwardly of the first motor, the grinder means being affixed to the forward extension of the motor shaft.

8. The machine of claim 7 and a cutting blade affixed to the rearward extension of the motor shaft.

9. The machine of claim 1 wherein the vacuum system means comprises a second vacuum inlet, the second vacuum inlet being exposed on the cabinet in a manner to permit the interconnection of an exterior vacuum hose to the second vacuum inlet.

10. A portable machine for tapering fiberglass pipe ends comprising
    a generally U-shaped frame having a forward bulkhead,
    a rear wall spaced from the bulkhead and a strut interconnecting the bulkhead and the rear wall, the bulkhead and the rear wall being provided with aligned openings therethrough, the bulkhead comprising a forward surface;

a motor shaft journalled for rotation within the said aligned openings, the shaft extending forwardly of the bulkhead forward surface and rearwardly of the rear wall; a grinder affixed to the forward extension of the motor shaft, the grinder being adapted for rotation forwardly of the forward surface of the bulkhead; and a mandrel forwardly affixed to the bulkhead forward surface in spaced relationship to the grinder, the mandrel having a longitudinal axis and the grinder having a longitudinal axis, the longitudinal axis of the mandrel being angularly offset from the longitudinal axis of the grinder;

whereby the end of a length of fiberglass pipe applied over the mandrel will be presented to the grinder in precise, angularly offset relationship.

11. The portable machine of claim 10 and vacuum means affixed to the frame near the grinder to gather fiberglass particles resulting from the pipe tapering operation.

12. The portable machine of claim 11 wherein the portion of the motor shaft extending rearwardly of the rear wall is adapted for securing to and being rotated by a portable electric drill.

13. The portable tapering machine of claim 11 wherein the vacuum system comprises a curved hood overfitting a portion of the grinder and an elongated vacuum hose, the vacuum hose having an inlet end positioned near the outer periphery of the grinder.

14. The method of forming a taper in the end of a length of fiberglass pipe comprising
  mounting a grinding wheel shaft having a longitudinal axis within an enclosing cabinet comprising a fixed bulkhead having a rearward surface and a forward surface and rotating a grinding wheel forwardly of the said forward surface;
  mounting a mandrel having longitudinal axis in spaced, stationary relationship to the grinding wheel upon the forward surface of the bulkhead;
  positioning the axis of the mandrel in angular relationship to the axis of the grinding wheel, the angularity between the respective axes being about 1¾ degrees;
  manually telescoping a length of fiberglass pipe interiorly of the cabinet over the mandrel until the pipe contacts the grinding wheel;
  rotating the pipe about the mandrel while continuously telescoping the pipe over the mandrel; and
  tapering the end of the fiberglass pipe with the rotating grinding wheel.

15. The method of claim 14 wherein the telescoping comprises contacting the forward surface of the bulkhead with the pipe after the tapering.

16. The method of claim 15 and the further step of positioning a vacuum inlet interiorly of the cabinet in the vicinity of the grinding wheel and applying a vacuum system having suction forces at the vacuum inlet.

17. The method of claim 16 and the step of electrically interconnecting the vacuum system and the grinding wheel to provide suction forces at the vacuum inlet at all times when the grinding wheel is rotating.

18. The method of claim 17 and the further step of extending the grinding wheel shaft rearwardly and affixing a cut-off blade to the rearward shaft extension, rotating the cut-off blade in spaced relationship to the grinding wheel and cutting the length of fiberglass pipe with the cut-off blade.

19. A machine for tapering fiberglass pipe ends comprising a frame including a bulkhead, the bulkhead having a planar forward surface, a rearward surface and an opening therethrough;
  a grinder motor mounted upon the frame rearwardly of the rearward surface of the bulkhead, the motor rotating a shaft, the motor shaft extending through the said bulkhead opening;
  grinder means secured to the shaft forwardly of the forward surface of the bulkhead, the grinder means being rotated by the shaft to taper an end of a length of fiberglass pipe;
  stationary mandrel means mounted upon the forward surface of the bulkhead in spaced relationship to the grinder means to guide the end of the fiberglass pipe toward the grinder means, the grinder means and the mandrel means each having a longitudinal axis, the axis of the grinder means being substantially normal to the forward surface of the bulkhead the axis of the mandrel means being angularly offset from the axis of the grinder means by approximately 1¾ degrees.

20. The machine of claim 19 and vacuum system means mounted adjacent to the grinder means to prevent the escape of fiberglass dust resulting from the tapering operations.

21. The machine of claim 20 wherein the vacuum system means comprises an inlet positioned near the grinding means to attract fiberglass particles and dust resulting from fiberglass pipe end tapering operations.

22. The method of forming a taper in the end of a length fiberglass pipe comprising
  mounting a rotatable grinder having a longitudinal axis adjacent to a bulkhead having forward and rearward surfaces, rotating the grinder forwardly of the said forward surface, and positioning the axis of the grinder substantially normal to the forward surface of the bulkhead;
  mounting a mandrel having a longitudinal axis upon the forward surface of the bulkhead in spaced, stationary relationship to the grinder;
  positioning the axis of the mandrel in angular relationship to the axis of the grinder, the angle of the axis of the mandrel to the angle of the axis of the grinder being approximately 1¾ degrees;
  manually applying an end of a length of fiberglass pipe by sliding the pipe over the mandrel toward the bulkhead until the pipe contacts the grinder;
  rotating the pipe about the mandrel while contacting the grinder with the pipe; and
  tapering the end of the fiberglass pipe with the rotating grinder.

23. The method of claim 22 wherein the rotating comprises manually rotating the pipe.

24. The method of claim 23 and the further step of positioning a vacuum inlet in the vicinity of the grinder and applying a vacuum system having suction forces at the vacuum inlet.

* * * * *